United States Patent [19]

Menzel

[11] Patent Number: 4,743,002

[45] Date of Patent: May 10, 1988

[54] AUTOMATIC DIE CLAMP

[75] Inventor: Klaus R. Menzel, Orchard Lake, Mich.

[73] Assignee: Schreiber Manufacturing Co., Inc., Rochester Hills, Mich.

[21] Appl. No.: 842,828

[22] Filed: Mar. 24, 1986

[51] Int. Cl.[4] .......... B23Q 3/08

[52] U.S. Cl. .......... 269/32; 269/93; 269/237; 269/227; 269/289 MR; 269/232; 269/234; 269/254 R

[58] Field of Search .......... 269/27, 30, 32, 217, 269/227, 237, 254 R, 289 MR, 232, 234, 20, 24, 93, 94, 99, 100, 135, 138, 309

[56] References Cited

U.S. PATENT DOCUMENTS

| | | | |
|---|---|---|---|
| 3,347,542 | 10/1967 | Merick, Jr. | 269/32 |
| 3,663,115 | 5/1972 | Vindez et al. | 269/32 |
| 3,858,867 | 1/1975 | Claycomb | 269/27 |
| 3,970,296 | 7/1976 | Rameson | 269/93 |
| 4,500,081 | 2/1985 | Carossino | 269/93 |

*Primary Examiner*—Frederick R. Schmidt
*Assistant Examiner*—Judy J. Hartman
*Attorney, Agent, or Firm*—Cullen, Sloman, Cantor, Grauer, Scott & Rutherford

[57] ABSTRACT

An improved mechanism for automatically clamping a die tool to a press bed or press ram. The automatic die clamp is self-locking and self-compensating to provide a failsafe operation in the clamped position and thus the mechanism retains the clamp in the clamped position. A ramp is provided to guide the movement of a wedge which wedge movement controls the movement of a clamping member. A spring bias may be provided as an optional feature to assist in the self-locking. Release of the clamp requires the application of an external force to overcome the locking of the teeth.

18 Claims, 3 Drawing Sheets

AUTOMATIC DIE CLAMP

BACKGROUND OF THE INVENTION

The present invention relates to an automatic clamping means for clamping dies to a press ram or a press bed. More particularly, the present invention relates to a clamping means having an improved retaining system that is self-tightening and self-compensating, and that normally retains a clamp in the clamped position by the mechanical interaction of various components or elements of the clamp. An externally applied force is required to release the clamp. The clamp is continuously self-tightening and self-compensating and remains clamped unless and until the external force is applied.

There are two basic types of clamps utilized for clamping a die; the first is the toggle type and the second is the fluid pressure type. Considering first the toggle type, this refers to either a manual or automatic type of clamp which is generally retained in the clamping position by a toggle that locks over top-dead center or pre-top-dead center. This type of clamp, has, typically, a narrow locking window. Thus, a problem with this type of clamp is the continual wear which begins to loosen the toggle. This wear causes a change in clamping pressure and performance and changes the clamping angle and efficiency of the clamp. Furthermore, this type of clamp suffers the problem that if the die is too thick, when the die is positioned on the press or press bed, the toggle might not reach the "locking" window.

To overcome these problems, the toggle type of clamp must be regularly adjusted or replaced. If close and frequent inspections are not made, the toggle, which can wear as previously described, may break thus releasing the tool or die from the press ram with the attendant problems.

The second type of clamp, as briefly mentioned above, is the type of clamp which is generally controlled by hydraulic or pneumatic pressure. This type of clamp is retained in position by continuous "fluid" pressure forcing the clamp into engagement. If the pressure drops, as for example by a broken line, the clamp will loosen or release dramatically creating the possibility of damage to the machinery and equipment. Therefore, the fluid pressure type of clamp requires additional safety devices or additional safety features.

BRIEF SUMMARY OF THE INVENTION

The present invention overcomes the above disadvantages by providing a clamp mechanism for safely and securely clamping a die to either a press ram or a press bed. In this regard, a mechanism is provided having several independent but coacting elements. That is, the independent elements mechanically cooperate to provide a self-tightening, self-compensating automatic die clamp which, in the normal position, is engaged with the die and which requires an external force to release the clamp from the die.

There are two types of movements involved with the present clamp. The primary movement is the clamping (and unclamping) movement which includes the self-tightening and self-compensating feature. The second movement of the clamp is pivotal movement for clearance purposes as will be explained.

Considering first the clamping movement, a clamping bolt for clamping the die is supported by a housing and moves vertically within the housing from a disengaged position to an engaged or clamping position. The clamping bolt is normally in the engaged position and must be forcibly disengaged. Vertical movement of the clamp and bolt is achieved through the interaction of complementary interfitting thread-like teeth on one exterior side of a wedge and on a bolt slide which fixedly supports the clamping bolt. The teeth are at an angle to the horizontal and as the wedge moves horizontally, the bolt slide moves vertically to engage or disengage the clamping bolt. More specifically, due to the angle of the teeth, as the wedge is retracted into the housing, the teeth continually force the bolt vertically into an engaged position as the wedge moves horizontally. This, in conjunction with an inclined surface and a biasing means, provides an automatic die clamp that is normally in the vertical clamping position and is self-tightening and self-compensating.

Considering next unclamping or disengagement, as the clamping bolt is forcibly disengaged or vertically lowered, the continued force first unclamps the clamp and thereafter commences a pivotal clearance movement through which the housing thereafter pivots clear such that a different die may be attached to the press or bed. Thus, the continued vertical movement of the clamping bolt results in the wedge member sliding and coacting with a cam plate so that extension of the wedge means forces the housing to pivot. In one embodiment, a block is mounted in a housing and the block slides within the housing.

The cam plate, which is often referred to as cam means, is an inclined ramp positioned adjacent to the block and the cam plate guides the movement of the housing. The ramp is inclined in the direction of pivotal movement of the housing and, in the preferred embodiment, roller means are attached to one end of the block and the roller moves along the ramp as the block slides within the housing.

Thus, due to the guiding of the inclined surface or ramp, a force must be applied to the extensible block to permit the housing to pivot. Additionally, a biasing means is provided to further restrict, limit, and guide the pivotal movement of the housing.

BRIEF DESCRIPTION OF THE DRAWINGS

The various benefits, objects and advantages of the present invention will become more apparent upon reading the following detailed description of the invention taken in conjunction with the drawings.

In the drawings, wherein like reference numerals identify corresponding components.

DETAILED DESCRIPTION OF THE INVENTION

Figure 1:
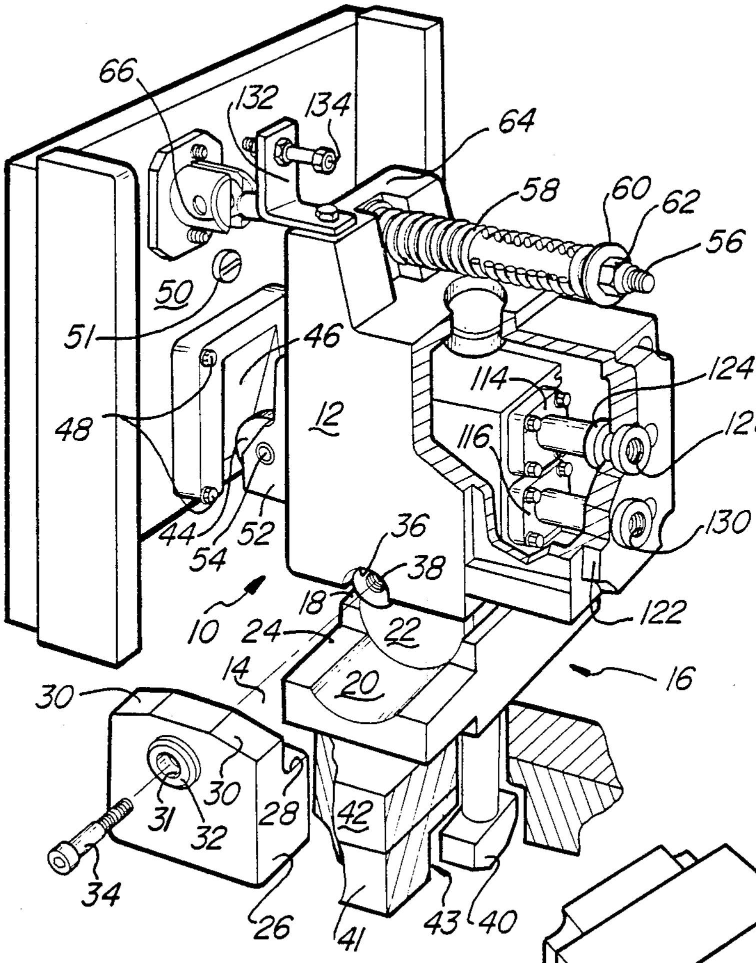
FIG. 1 is a partially cutaway, partially exploded perspective view of the automatic die clamping mechanism as viewed from the rear.

With reference to FIG. 1, the automatic die clamp 10 of the present invention is generally illustrated including a housing 12 pivotally mounted to a die mounting surface 14 by a pivot yoke 16. The yoke 16 is actually a thrust plate mounted on pivots and positioned between the press and the clamp and secured to the die mounting surface 14 in a conventional manner such as, for example, by machine bolts (not shown). The upper surface 18 of the thrust plate-yoke 16 has formed therein a semi-cylindrical elongated bearing surface 20 on which bearing surface is positioned an elongated, semi-cylindrical pivot means 22 which extends from the bottom surface of the housing 12. Pivot means 22 is journaled within the bearing surface 20 and provides a pivot surface for the housing 12.

The surface 18 is provided with a step-down or shoulder 24 to receive upright ears 26 which pivotally retain the housing 12 in the yoke means 16. In the preferred embodiment, each ear 26 is generally formed as a rectangular block with an elongated notch or shoulder portion 28. The top of the ear 26 is provided with spaced apart sloped surfaces 30 to provide clearance for the movement of the housing 12 and prevent interference with any pivotal movement thereof. Ears 26 are secured to the yoke 18 such as, for example, by machine bolts as will be explained.

Each ear is provided with a tranverse aperture 31 therethrough and a bushing 32 is fitted into the aperture. A fixed bearing member 34, such as a sleeved machine bolt, is inserted through the bushing. A recess 36 is provided in the side of the housing 12 and a threaded aperture 38 is provided within the recess. When the ears 26 are assembled to the housing 12, bushing 32 is received within the recess 36 in the side of the housing and the member 34 may be threaded into the threaded aperture 38 at the base of the recess 36.

Figure 3:
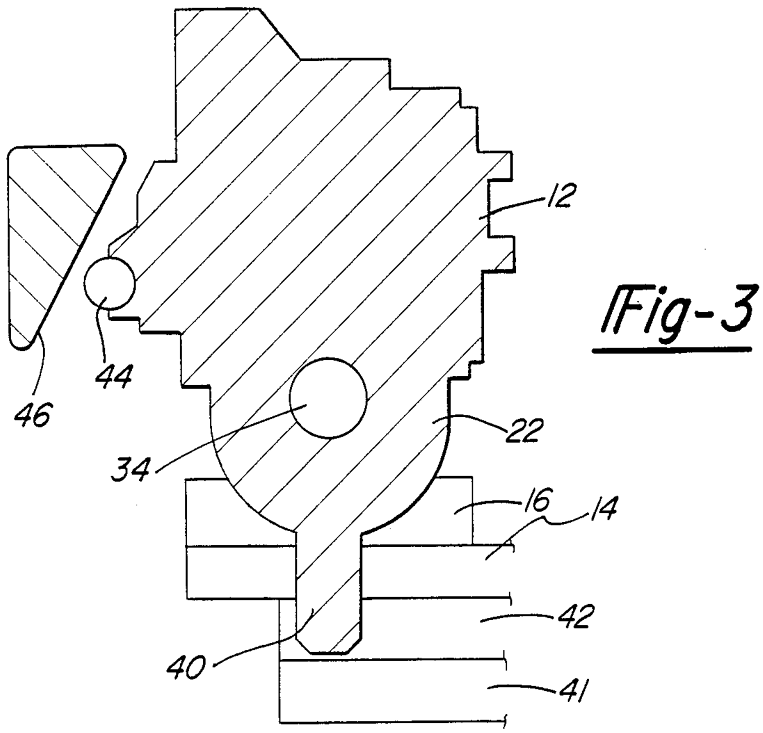
FIG. 3 is a side view of the automatic die clamping mechanism in the clamped position.

According to the principles of the present invention, the housing 12 is intended to move at least between a clamping position and an unclamping position and is further intended to move pivotally to provide clearance as previously described. With reference to FIGS. 1 and 3, the clamping action of the present invention will now be described. The present invention includes a member 40 which in the preferred embodiment may be an elongated T-bolt which forms a major portion of the clamping means of the present invention. A tool 41 (or adapter tool plate) which may be positioned, for example, beneath a press plate 42, is provided with a T-slot 43. The T-slot extends through both the tool (die, adapter plate, etc.) 41 and the press plate 42. The T-bolt clamping means 40 extends through the T-slot 43 and tightly clamps the tool 41 against the ram or bed of the press. The term "at least" is utilized because, in the orientation illustrated, the T-bolt will move a distance, vertically, without engaging the tool.

Figure 4:
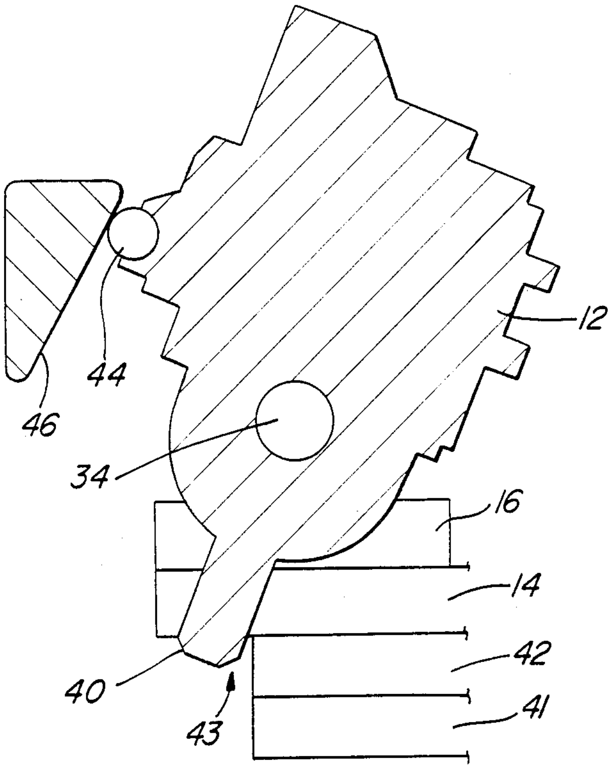
FIG. 4 is a side view of the automatic die clamping mechanism in the released position.

For the purpose of a preliminary comparison, reference may be had to FIG. 4 which illustrates an unclamped position of the housing where T-bolt 40 has first been released from clamping engagement with the tool 41 and thereafter pivots within the T-slot 43 to provide movement of the housing and thus the desired clearance.

Guide means 44, preferably a roller, moves along an inclined surface of a stationary ramp 46. The clamping system not only retains the housing in the first or clamped position but prevents pivotal movement unless a force is applied to cause the roller means 44 to travel up the ramp 46. Ramp 46 is secured, for example, as by machine bolts 48, to a bridge 50 which functions as a fixed or immovable surface. A stop member, such as a block 51, is adjustably secured (such as by a set screw) to the bridge 50 above the ramp 46. Guide means 44 may be secured to the housing 12 such as by mounting the guide means 44 within a bracket 52. A pin 54 may be provided such that the guide means may rotate on the pin 54 with the ends of the pin mounted within the bracket 52.

An elongated spring bolt 56, which may be surrounded by a spring 58, bears against the housing to bias for pivoting the housing. More specifically, the spring 58 is held in compression by providing, at one end of the spring bolt 56, a washer and nut combination 60, 62, respectively, and, at the opposite end of the spring bolt, the spring bears against a raised bearing surface 64 on the housing. The force may be adjusted by moving the nut 62 on the spring bolt 56. The opposite end of the spring bolt 56, that is, the end of the spring bolt opposed from the washer and nut combination, is pivotally retained within a clevis 66 which is attached (such as by machine bolts or other conventional techniques) to the bridge 50 of the clamp.

Figure 2:
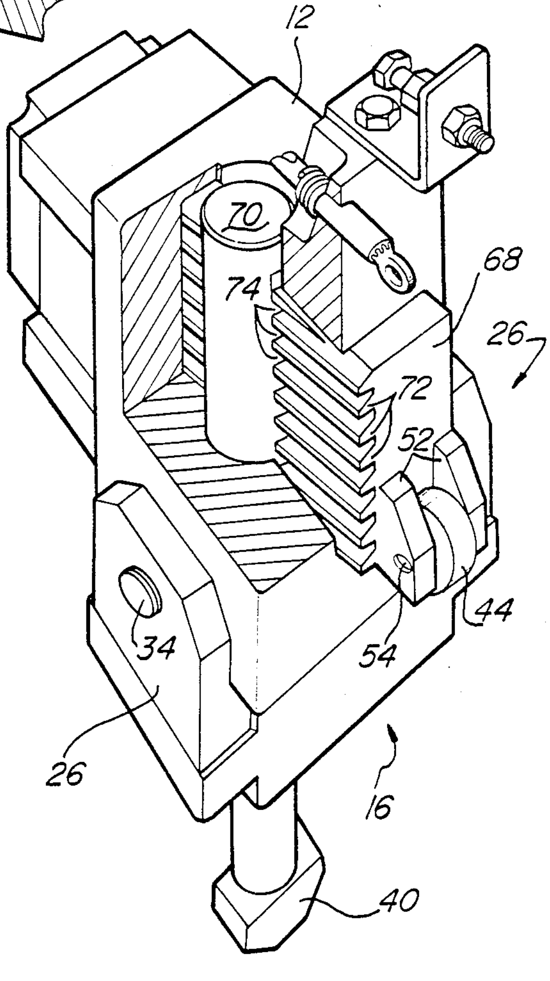
FIG. 2 is a partially cutaway perspective view of the automatic die clamping mechanism as viewed from the front.

As previously indicated, means are provided for the self-compensating, self-tightening feature of the present invention. With reference to FIG. 2, a portion of the self-tightening, self-compensating clamping feature will now be explained. As indicated earlier, bracket 52 is provided for mounting the roller or guide means 44. The bracket 52 is preferably machined from a large solid block 68 and the block 68 may be thought of as an extensible member or wedge means. The wedge means 68 slides into and out of the housing 12 in response to forces applied thereto as will be further explained. The wedge means 68 has a plurality of functions. First, movement of the wedge means provides the force necessary to cause the guide means 44 to roll or travel along the ramp 46 which in turns controls pivotal movement of the housing 12 with respect to the thrust plate-yoke means 16. In addition, wedge means 68 cooperates with the clamping means or T-bolt 40 through a T-bolt extension or rod 70 between the engaged and disengaged positions with respect to the tool or tool-adapter plate as previously mentioned.

Providing additional detail, vertical movement of the clamping means 40 between the engaged and disengaged positions is directly related to the extension and retraction of the wedge means 68 and its interaction with the extension 70 to which the clamping means or T-bolt 40 is attached. Specifically, wedge means 68 is provided with a series of angled teeth 72 which mate with corresponding teeth 74 on the extension 70. The teeth 72 and 74 are at the same angle relative to the horizontal such that as the wedge means 68 moves, extension 70, and thus the clamping means 40 secured thereto, move vertically. In this fashion, champing means 40 is either raised into engagement with the tool, thereby clamping the tool to the ram or bed of the press, or lowered to disengaging position wherein the clamping menas 40 may thereafter be pivoted to provide clearance for quick change of the tool or the like.

At this point, it is appropriate to explain various details as to the angle of the teeth 72 and 74 relative to the horizontal. The angle, of course, affects the relative movement and the force ratio or efficiency of the system. Seven degrees is considered the locking angle; that is, if the angle is seven degrees or less, since the parts are steel and based upon the friction coefficient, there is a self-locking feature. Thus, if the angle is below seven degrees, biasing to assist in maintaining the housing in a clamped position, as explained later, is not necessary (although that they may certainly be provided as a failsafe feature). However, if the angle of the teeth exceeds seven degrees, then biasing means would be necessary.

An important distinction between the clamping means of the present invention and prior art clamps will now be explained. In prior art clamps, it was necessary to use hydraulic pressure to maintain the clamping force. Thus, if a fluid line ruptures, or there is a drop in hydraulic pressure, the clamping force is removed and the dies or the like may break free. According to the present invention, while hydraulic fluid may be utilized to move the clamp means from an unclamped position to a clamped position, once the clamp means is in a clamped position, it is self-tightening and self-compensating without regard to the presence or absence of a hydraulic force. That is to say, once clamping is achieved based upon the angle of the teeth 72, 74 and the presence, if necessary, of additional biasing means (depending upon the angle of the teeth as previously described), the present system will remain clamped. Thus, the hydraulic features of the present invention, which will now be described, are to be used to move the clamp system between the clamped and the unclamped position but not to maintain the clamping system in the clamped position.

Figure 5:
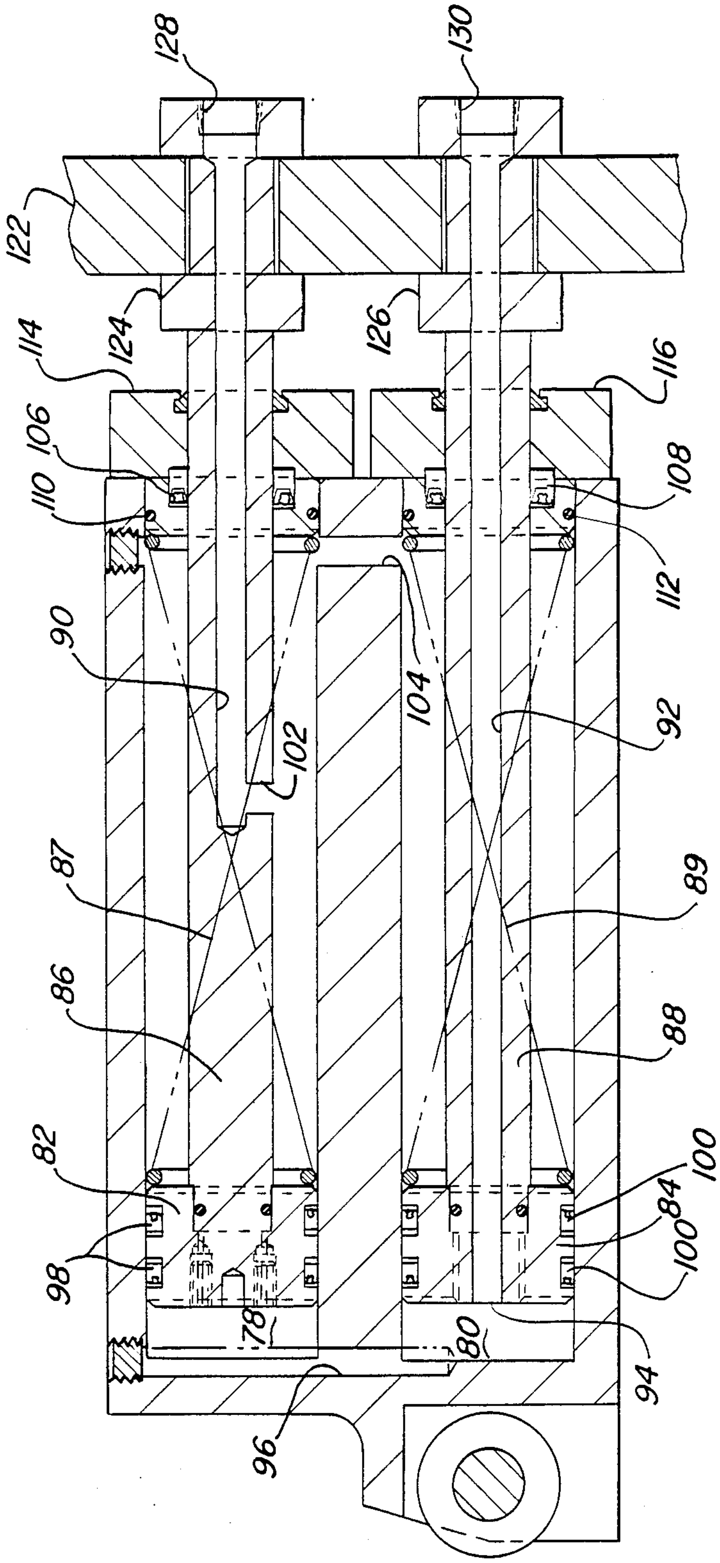
FIG. 5 is a cross-sectional view of a portion of the automatic die clamping mechanism of the present invention.

With respect to FIGS. 1 and 5, the system includes within the wedge means 68, first and second cylindrical interior chambers 78, 80 respectively, each sealingly receiving first and second pistons 82, 84 respectively. Piston 82 is secured to the end of a rod 86 and piston 84 is connected to the end of a rod 88. Biasing means such as springs 87, 89 may surround the rods 86, 88, respectively. These springs assist in maintaining the housing in the clamped (locked) or vertical position.

Hydraulic fluid channels 90, 92 extend through the rods 86, 88 respectively. More specifically, channel 90 extends halfway through rod 86 and channel 92 extends the full length of the rod 88 and terminates in an exit port 94 which permits fluid to fill chambers 78 and 80. More particularly, a cross passage or conduit 96 is provided between chambers 78 and 80 such that upon introduction of fluid through channel 92, the fluid flows through the channel and out the exit port 94 into chamber 80 and through the cross passage or conduit 96 into the chamber 78. The pistons 82 and 84 are provided with O-rings 98, 100, respectively, to prevent any fluid within the chambers from flowing past the pistons. The positioning of the cylinder within the wedge means is dictated by overall size requirements since one cylinder could be placed outside the wedge without adversely affecting the operation of the system.

If hydraulic fluid is introduced into channel 90, since channel 90 extends only part of the length of piston rod 86, hydraulic fluid flows through the channel and out a port 102 near the middle of the channel and thereafter fluid flows on the opposite side of the piston 82 from the chamber 78 and also flows through a cross port 104 to communicate with the side of the piston 84 which is opposite the chamber 80.

The end of the wedge means 68 opposite the guide means 44 is sealed such as by rod seals 106, 108, O-rings 110, 112 and cylinder caps 114, 116. The channels 90 and 92 are actually provided interiorly of rods 118, 120. One end of each rod 86, 88 is fixed to a slide bridge 122 by retaining nuts 124 and 126, respectively. The slide bridge 122 is positioned on the side of the housing 12 opposite the guide means 44. The rods 86 and 88 may be provided with threads 128, 130 or the like for receipt of the fluid lines.

With this explanation of the structure, the operation of the system will now be briefly reviewed. Upon introduction of hydraulic fluid into the channel 90, fluid builds up on the right side of the piston, as seen in FIG. 5, thus causing the wedge means 68 to move to the right in FIG. 1 relative to the fixed bridge 122. In FIG. 1, this correlates to vertical upward movement of the wedge means 68 which, through the teeth 72, 74, becomes clamping movement of the clamping means 40 and the extension 70. Once clamping has been achieved, the clamping force itself (plus the biasing means 87, 89 which is optional if the teeth angle is seven degrees or less but necessary if the teeth angle exceeds seven degrees) keeps the clamp secured in a failsafe, locking position.

When it is desired to unclamp the system, fluid is introduced in channel 92 and this flows through channel 92 the full length of the rod to fill the chambers 78 and 80, thus causing movement of the wedge means 68 to the left in FIG. 1 which, when viewed in FIG. 2, may be identified as downward and thereafter pivotal movement of the wedge means and housing causing unclamping and thereafter pivoting clearance so that a different die may be utilized.

The present invention also contemplates the provision of a switch plate 132 attached to the top surface of the housing 12 which switch plate may include an adjustable contact member 134. The contact member 134 is in alignment with and contacts a conventional microswitch (not shown) which permits automatic control of the clamp.

Since the clamping means is moved into a fully clamped position, any wear on the clamp is compensated for by such movement.

The foregoing is a description of a preferred embodiment of the present invention. Various modifications may be made without departing from the spirit and scope of the present invention. The present invention, therefore, should be limited only by the following claims.

What is claimed is:

1. An automatic clamping mechanism for automatically clamping a tool to a press comprising:

- a housing pivotally mounted by a pivotal mounting means to said press such that said housing is pivotable between a first position and a second position;
- clamping means operably supported by said housing, said clamping means being engaged with said tool when said housing is in said first position and disengaged from said tool when said housing is in said second position;
- control means for operating said clamping means between said first and second positions;
- said control means including a wedge means slidably received within said housing operable between a retracted position wherein said housing is in said first position and an extended position wherein said housing is in said second position;
- said wedge means including a first set of teeth angled with respect to the horizontal when said housing is in said first position, said teeth positioned along the exterior of one side of said wedge means;
- a vertical sliding member adjacent said wedge means having a complimentary second set of teeth along one side thereof interfitting with said first set;

said clamping means affixed to said sliding member;

said sliding member and clamping means vertically moving in response to the interaction of said first and second teeth as said wedge means operates between said retracted position and said extended position;

means for retaining said housing in said first position wherein a positive force is required to pivot said housing to said second postion, said means continually urging said housing to said first position;

whereby, said clamping means operates between a clamped position wherein said tool is clamped to said press and a released position wherein said tool is released.

2. The automatic clamping mechanism of claim 1, wherein said retaining means comprises:

an inclined surface adjacent said housing, said surface increasing diverging from a horizontal plane in the direction of pivotal movement of said housing as said housing pivots from said first position to said second position;

said surface having a first end at said horizontal plane and a second end opposite said first end a spaced distance from said horizontal plane;

guide means affixed to said control means operably engaging said surface and traveling along the length of said surface as said housing pivots;

said guide means being adjacent said first end when said housing is in said first position and adjacent said second end when said housing is in said second position;

wherein said control means forces said guide means along said surface to pivot said housing to said second position.

3. The automatic clamping mechanism of claim 2, wherein said control means further comprises:

a biasing means biasing said housing to said first position.

4. The automatic die clamping mechanism of claim 1, wherein said clamping means comprises:

an elongated shaft having first and second ends, said first end being operably received within said housing, said second end fixedly supporting a cross member;

said cross member being engagably receivable by said tool for clamping said tool to said press.

5. The automatic clamping mechanism of claim 1, wherein said wedge means further comprises:

at least one chamber having a first sealed end and a second end slideably received upon a guide rod;

said guide rod having a piston means affixed at one end adjacent said sealed end and said opposite end affixed to said housing;

said chambers being slideable with respect to said pistons such that said extensible member slides in said housing between said retracted position and said extended position.

6. The automatic clamping mechanism of claim 1, wherein said control means includes a biasing means biasing said clamping mechanism to said first position.

7. An automatic clamping mechanism for automatically clamping a tool to a press comprising:

a housing;

clamping means operatively supported by said housing, said clamping means being pivotable between a first position wherein said clamping means is disengaged from said work piece and a second position wherein said clamping means is engaged with said work piece;

control means contained with said housing and operatively coupled to said clamping means for pivoting and simultaneously reciprocating said clamping means between said first and second positions, said control means drawing said clamping means against said work piece in a straight line as said clamping means approaches said second position wherein said clamping means and said control means interact to exert an in-line compressive force upon said work piece; and coacting means and said control means to reciprocate said clamping means and simultaneously activate a pivot means;

8. The automatic clamping mechanism of claim 7, further comprising:

a retaining means having an inclined surface adjacent said housing, said surface increasingly diverging from a horizontal plane in the direction of pivotal movement of said clamping means as said clamping means pivots from said second position to said first position;

said surface having a first end at said horizontal plane and a second end opposite said first end a spaced distance from said horizontal plane;

guide means affixed to said control means operably engaging said surface and traveling along the length of said surface as said clamping means pivots;

said guide means being adjacent said first end when said clamping means is in said second position and adjacent said second end when said clamping means is in said first position;

wherein said control means forces said guide means along said surface to pivot said clamping means to said second position.

9. The automatic clamping mechanism of claim 7, wherein said control means includes an extensible member having a first set of angled teeth positioned along the exterior of said extensible member and a reciprocating member having a complimentary second set of teeth operatively interfitting with said first set;

said clamping member being affixed to said reciprocating member.

10. The automatic clamping mechanism of claim 9, wherein said control means further includes at least one chamber having a first sealed end and a second end slidably received upon a guide rod;

said guide rod having a piston means affixed at one end adjacent said sealed end and said opposite end affixed to said housing;

said chambers being slidable with respect to said piston such that said extensible member slides in said housing between said first and second positions.

11. The automatic clamping mechanism of claim 7, wherein said control means includes biasing means to bias said clamping mechanism to said second position.

12. The automatic clamping mechanism of claim 7, wherein said housing is pivotally mounted by a pivotal mounting means to said press such that said housing is pivotable between said first position and said second position.

13. An automatic clamping mechanism for automatically clamping a tool to a press comprising:

a housing;

clamping means operatively supported by said housing, said clamping means being pivotable between a first position wherein said clamping means is disengaged from said work piece and a second position wherein said clamping means is engaged with said work piece;

control means contained with said housing and operatively coupled to said clamping means for pivoting and simultaneously reciprocating said clamping means between said first and second positions, said control means drawing said clamping means against said work piece in a straight line as said clamping means approaches said second position wherein said clamping means and said control means interact to exert an in-line compressive force upon said work piece; and coacting means and said control means to reciprocate said clamping means and simultaneously activate a pivot means;

said control means including an extensible member having a first set of angled teeth positioned along the exterior of said extensible member and a reciprocating member having a complimentary second set of teeth operatively interfitting with said first set.

14. The automatic clamping mechanism of claim 13, further comprising:

a retaining means having an inclined surface adjacent said housing, said surface increasingly diverging from a horizontal plane in the direction of pivotal movement of said clamping means as said clamping means pivots from said second position to said first position;

said surface having a first end at said horizontal plane and a second end opposite said first end a spaced distance from said horizontal plane;

guide means affixed to said control means operably engaging said surface and traveling along the length of said surface as said clamping means pivots;

said guide means being adjacent said first end when said clamping means is in said second position and adjacent said second end when said clamping means is in said first position;

wherein said control means forces said guide means along said surface to pivot said clamping means to said second position.

15. The automatic die clamping mechanism of claim 13, wherein said clamping means comprises:

an elongated shaft having first and second ends, said first end being operably received within said housing and affixed to said control means, said second end fixedly supporting a cross member;

said cross member being engagably receivable by said tool for clamping said tool to said press.

16. The automatic clamping mechanism of claim 13, wherein said control means includes biasing means biasing said clamping mechanism to said second position.

17. The automatic clamping mechanism of claim 13, wherein said control means further includes at least one chamber having a first sealed end and a second end slidably received upon a guide rod;

said guide rod having a piston means affixed at one end adjacent said sealed end and said opposite end affixed to said housing;

said chambers being slidable with respect to said piston such that said extensible member slides in said housing between said first and second positions.

18. The automatic clamping mechanism of claim 13, wherein said housing is pivotally mounted by a pivotal mounting means to said press such that said housing is pivotable between said first position and said second position.

* * * * *